July 30, 1968

F. I. JOHNSON 3,394,608

CHAIN CONSTRUCTION

Filed June 20, 1966

Inventor:
Fred I. Johnson
By Hofgren, Wegner,
Allen, Stellman & McCord Attys

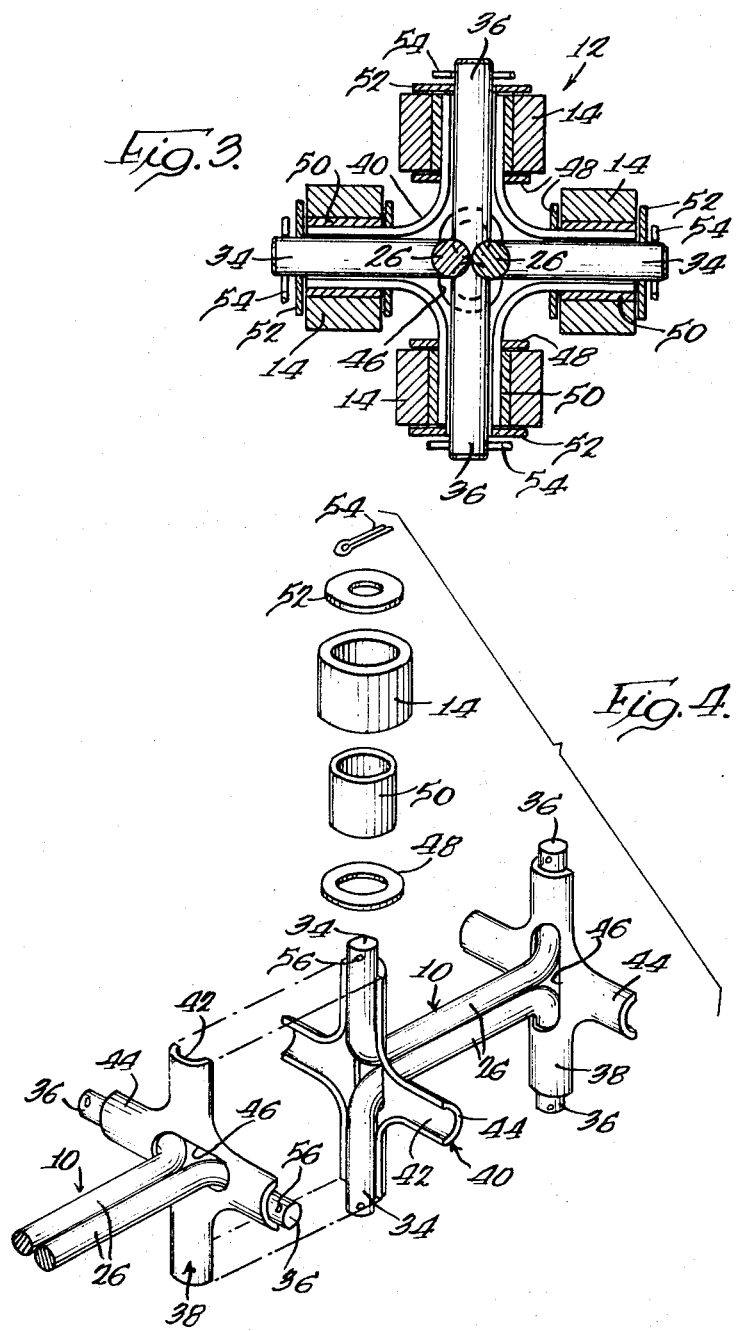

3,394,608
CHAIN CONSTRUCTION
Fred I. Johnson, 369 Montrose Ave.,
Elmhurst, Ill. 60126
Filed June 20, 1966, Ser. No. 558,726
8 Claims. (Cl. 74—246)

ABSTRACT OF THE DISCLOSURE

A chain made up of a plurality of links each of which includes a body and stub shafts projecting transversely outwardly therefrom, connecting means universally and pivotally interconnecting the stub shafts on the ends of serially adjacent links such that the stub shafts on the adjacent ends of adjacent links are fixed at right angles to each other in substantially a single plane, and roller means journalled on the stub shafts and adapted to be operatively associated with a sprocket.

Disclosure

This invention relates to chain for conveying or for use in drive trains, and more specifically, to chains having universal, pivotal connections between the links for use in installations requiring various runs of the chain to be disposed in a plurality of differing planes.

Many industrial installations include equipment having power drives or conveyor arrangements that are such as to require the flexible drive or conveyor member to be disposed in two or more planes at differing stages of the run thereof. Normally, such power drive or conveyor requirements have been met through the use of flexible belts as opposed to a more rigid drive or conveyor device such as a link chain. In many such instances, it is desirable to use a chain rather than a flexible belt. For example, in the case of power drives, the ability of a chain to provide a positive drive without the slippage often encountered in belt drives is desirable. Furthermore, whether the use be in a conveyor or in a drive, the use of a chain with the accompanying long life thereof provides a significant advantage over the use of the relatively short-lived belts.

Many efforts have been made to provide a flexible drive chain for use in drives requiring that the flexible driving member be disposed in two or more planes during various portions of its run. The chains resulting from these efforts, while relatively complex, have met with a fair modicum of success. However, since the structure of such chains is relatively complex, the fabrication and assembly cost thereof is rather high and, as a result, the use of such chains is, to some extent, accompanied by an economic drawback.

It is, therefore, the primary object of the invention to provide a new improved chain for use in drives or conveyors requiring that various portions of the chain during the run thereof be disposed in different planes.

More specifically, it is an object of the invention to provide a chain such as that mentioned in the preceding paragraph that is of simple and economical construction.

Another object is the provision of such a chain that is made of two basic elements, namely, a plurality of identical links which are disposed end to end with alternate ones of the links being turned thru 90° about the length of the chain relative to the adjacent links, and a plurality of identical connector brackets, two of which are disposed at each joint between adjacent links and wherein one bracket at each joint is turned thru 90° about the length of the chain relative to the other bracket at the joint.

Yet another object of the invention is the provision of a chain having a plurality of rigid links, each having stub shafts projecting transversely outwardly from the links at both ends thereof and means universally and flexibly interconnecting the ends of adjacent links such that the stub shafts on the ends of adjacent links are disposed at right angles to each other and in substantially a single plane.

Another object of the invention is the provision of a chain such as that mentioned in the preceding paragraph wherein the link is formed in the shape of an I by securing a pair of C-shaped members in a back-to-back relationship within a single plane.

A further object is the provision of a chain such as that mentioned above wherein the means flexible and universally interconnecting adjacent links include a bracket having four bearing members, each disposed at right angles to the adjacent bearing members on the bracket and receiving the stub shafts on the adjacent ends of the adjacent links to provide a universal joint.

A still further object is the provision of a chain such as that mentioned in the preceding paragraph wherein the bracket member is formed of two mating members, each in the shape of a cross and wherein the bearing members are provided by forming each of the arms of the cross with a concave bearing surface and a convex outer surface and including a roller that is adapted to engage a sprocket journaled on the convex outer surface of each bearing member.

Other objects and advantages of the invention will become apparent from the following specification taken in conjunction with the accompanying drawings in which:

FIG. 3 is a vertical section taken approximately along the line 3—3 of FIG. 2; and FIG. 4 is an exploded view of the chain including the means interconnecting adjacent links.

Figure 1:
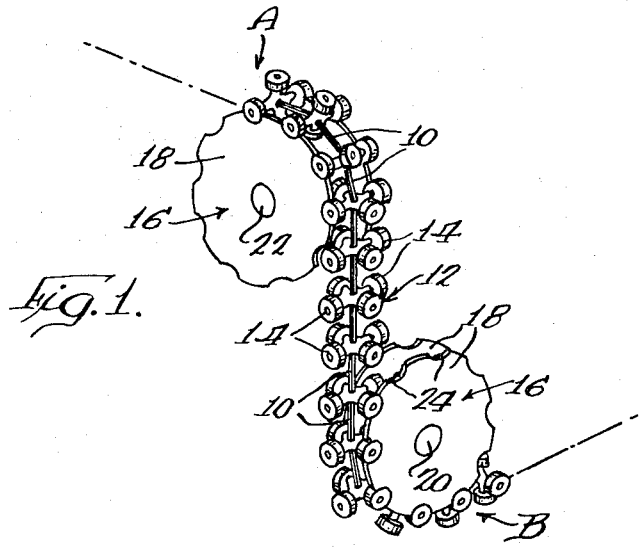
FIG. 1 is a perspective view of a chain made according to the invention trained about a pair of sprockets such that various portions of the run of the chain are disposed in two different planes.
Figure 2:
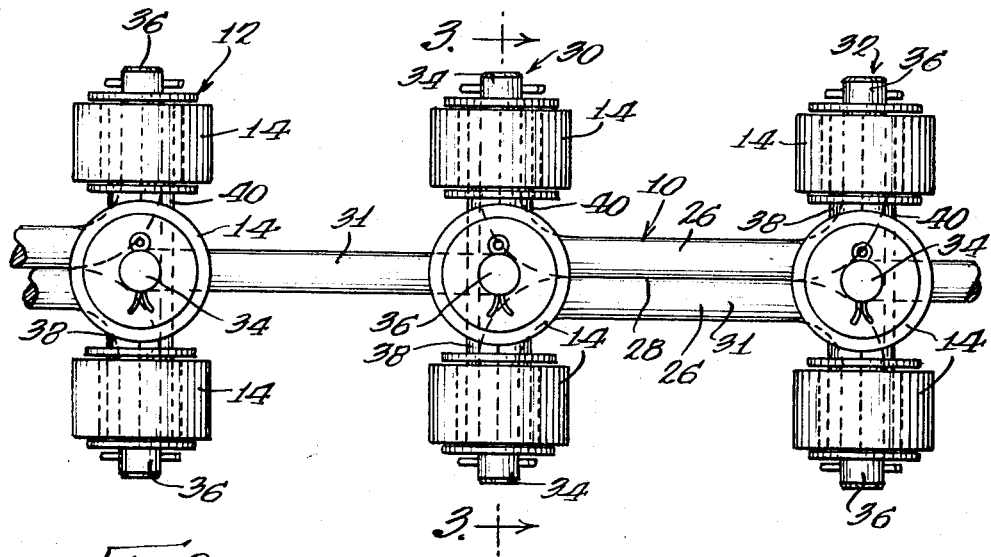
FIG. 2 is a plan view of a plurality of the links forming the chain.

As may be seen in FIGS. 1 and 2, an exemplary form of a chain made according to the invention includes a plurality of links 10. Adjacent ones of the links 10 include universal connections, generally designated 12, at the adjacent ends thereof. At each universal connection, there are disposed four rollers 14, each of which is adapted to engage a sprocket and thereby provide for smooth engagement of the chain with the sprockets as the former advances along its run. The chain so formed is trained about sprockets, generally designated 16, each sprocket 16 being comprised of a pair of sprocket members 18 mounted together or formed integrally in a spaced, side-by-side relation on a shaft 20 or a shaft 22. Each sprocket member 18 includes on its periphery, a plurality of roller engaging notches 24 and the notches 24 on each adjacent sprocket member 18 are aligned.

Because of the universal connection between the links 10, the chain may have various portions of its length disposed in different planes in the manner illustrated in FIG. 1. Certain ones of the links 10 have their rollers 14 disposed in the roller receiving notches 24 on the sprocket members 18 mounted on the shaft 22 while others are similarly arranged with respect to the sprocket members 18 mounted on the shaft 20.

It will be observed that the shafts 20 and 22 are generally transverse to each other and, due to the universal connection between the links 10, various portions of the chain may be disposed in two or more planes. For example, the run of the chain generally designated A is in one plane and the run of the chain generally designated B is in a second plane intersecting the plane A in a direction generally transverse thereto.

Turning now to FIG. 2, the links 10 are each comprised of two generally C-shaped members 26. The C-shaped members 26 are disposed in a back-to-back relationship within a single plane and, if desired, may be secured to each other as by welding 28 or the like.

The resulting configuration is generally that of an I having a base 30, a body 31 and a top 32. The base 30 provides a pair of stub shafts 34 that project generally transversely outwardly from the body 31 of the I while the top 32 of the I provides similar stub shafts 36 having a similar relationship to the body of the I. The stub shafts 34 on one link are disposed in a substantially single plane with the stub shafts 36 on the adjacent link, the plane normally being transverse to the length of a straight length of chain. The orientation of the stub shafts 34 and 36 within the plane is such that the stub shafts 36 are at right angles to the stub shafts 34.

The stub shafts 34 and 36 of adjacent links are secured in the above relationship to provide a universal and pivotal connection by means of a pair of mating bracket members 38 and 40 as best seen in FIG. 4. Each of the bracket members 38 and 40 is formed in the shape of a cross with each arm thereof having a concave inner surface 42. The concave inner surfaces 42 on the bracket members 38 and 40 provide first, second, third and fourth bearings, the first and third bearings receiving the stub shafts 34 on one link. The second and fourth bearings are disposed at right angles to the first and third bearings and receive the stub shafts 36 on the adjacent end of the adjacent link. Each arm additionally has a concave outer surface 44 for purposes as will be seen.

The center of each of the brackets 38 and 40 includes an elongated slot 46 through which the body of the I formed by the two C-shaped members 26 is received. The slot 46 has a width significantly greater than that of the C-shaped members 26 so as to permit a relatively large degree of pivotal movement of the latter relative to the bracket 38 or 40 in which the slot is formed.

To join the adjacent links 10 together, the brackets 38 and 40 having their respective stub shafts 36 and 34 disposed in the concave bearing surfaces 42 in the manner indicated in FIG. 4 are brought together into a mating relationship. A spacing washer 48 is disposed about corresponding arms of the brackets 38 and 40. A sleeve 50 having an outer bearing surface is then disposed on the arms of the brackets 38 and 40 to secure the two together and, in turn, a roller 14 is disposed about the bearing surface of the sleeve 50. A second spacing washer 52 is then disposed about the arms of the brackets 38 and 40 and in substantial abutment with the roller 14 and finally, a cotter pin 54 is disposed within a bore 56 located at the outer extent of each of the stub shafts 34 and 36. The cotter pin 54 is then suitably deformed and, as a result, serves to retain the roller 14 on the corresponding arms of the brackets 38 and 40.

The spacing washer 48 precludes the roller 14 from abutting adjacent arms on the brackets 38 and 40 to cause excessive wear thereof while the spacing washer 52 cooperates with the cotter pin 54 to retain the roller 14 and the sleeve 50 in their positions about the corresponding stub shaft 34 or 36 and the corresponding arms of the brackets 38 and 40. Of course, the foregoing procedure is repeated for each of the four arms of the brackets 38 and 40.

The resulting arrangement provides a connecting means for adjacent ones of the links 10 which maintains stub shafts 34 and 36 on adjacent ends of adjacent links in substantially a single plane and disposed at right angles to each other as seen in FIG. 3. Furthermore, the connecting means so formed permits rotation of the stub shafts 36 relative to the stub shafts 34 and vice versa, the axes of rotation of the stub shafts 34 and 36 being disposed at right angles to each other. As a result, the adjacent links 10 of which the stub shafts 34 and 36 form part are universally pivotally secured to each other to provide a completely flexible chain.

The universal pivotal interconnection between the links 10 just described permits a chain made according to the invention to be trained about sprocket members having their axes of rotation disposed in differing planes such as the arrangement shown in FIG. 1. It will be appreciated that the arrangement is such that as the links 10 in a first plane pass over a sprocket 16 such as that shown disposed on the shaft 22, only one set of the stub shafts 34 or 36 will pivot within the connecting means formed by the brackets 38 and 40. However, when the chain has advanced to a second sprocket 16 such as that mounted on the shaft 24, the other set of the stub shafts 34 or 36 will rotate within the securing means formed by the brackets 38 and 40 thereby permitting the chain to be advanced in a second plane different from the first plane.

From the foregoing, it will be apparent that I have provided a chain having universal pivotal connections between adjacent links that is relatively simple in its structure and which may be manufactured economically in that many of the parts are symmetrical and may be interchanged with each other. For example, any one of the links 10 could be placed in any position along the length of a chain as the links are identical as opposed to some arrangements wherein different types of links are used in alternate positions along the length of the chain. Furthermore, it will be apparent that the brackets 38 and 40 are readily interchangeable in that they are identical. It will also be apparent that since the sub shafts 36 and 34 are disposed in substantially a single plane at the joint between adjacent links, a true universal pivotal interconnecting structure is provided which enhances the smoothness of operation of the chain in a drive or conveyor application.

Having described a specific embodiment of my invention as required by 35 U.S.C. 112, I do not wish to be limited to the specific details set forth, but rather, to have my invention construed broadly according to the following claims.

I claim:
1. A chain comprising:
 (a) a plurality of links, each having an elongated central body portion terminating in stub shafts projecting transversely outwardly from the respective central body portion at both ends thereof;
 (b) a plurality of means universally and flexibly interconnecting the stub shafts on the ends of serially adjacent ones of said links for pivotal movement of each link relative to the adjacent link about the longitudinal axis of the respective stub shaft and fixing the stub shafts on the adjacent ends of adjacent links at right angles to each other in substantially a single plane; and
 (c) roller means journalled on said stub shafts to be operatively associated with a sprocket.
2. A chain comprising:
 (a) a plurality of links, each having stub shafts projecting transversely outwardly therefrom at both ends thereof and adapted to be operatively associated with a sprocket, each said link being generally in the shape of an I having a top portion, a base portion and a body portion with said stub shafts being comprised of said base portion and said top portion; and
 (b) a plurality of means universally and flexibly interconnecting the stub shafts on the ends of serially adjacent ones of said links for pivotal movement about its respective longitudinal axis and fixing the stub shafts on the adjacent links at right angles to each other in substantially a single plane.
3. The chain of claim 2 wherein each of said I-shaped links comprises a pair of generally C-shaped members disposed back to back within a common plane.

4. A chain comprising:
(a) a plurality of links, each having stub shafts projecting transversely outwardly therefrom at both ends thereof and adapted to be operatively associated with a sprocket; and
(b) a plurality of means universally and flexibly interconnecting serially adjacent ones of said links such that the stub shafts on the adjacent ends of adjacent links are disposed at right angles to each other in substantially a single plane, each said interconnecting means comprising bracket means including four internal bearings, the first and third bearings being disposed at right angles to the second and fourth bearings; the stub shafts at one end of a link being disposed in said first and third bearings; the stub shafts at the adjacent end of the adjacent link being disposed in said second and fourth bearings.

5. The chain of claim 4 wherein said bracket means comprise a pair of mating members each providing a portion of each of said four bearings.

6. The chain of claim 5 wherein each mating member is formed in the shape of a cross; each arm of the cross including a concave bearing surface engaging a corresponding stub shaft and a convex surface; means including a plurality of sleeves surrounding corresponding convex surfaces of said mating members for securing said mating members together; each of said sleeves including an outer bearing surface journaling a roller; and means for retaining said rollers and said sleeves on said arms.

7. A chain comprising: a plurality of rigid links having a central body and disposed in an end-to-end relationship and each having stub shafts projecting transversely outwardly from said body at both ends thereof, the stub shafts at the end of each link being disposed at right angles to the stub shafts at the adjacent end of the adjacent link and adapted to be operatively associated with a sprocket; and a plurality of connecting means interconnecting the adjacent ends of adjacent links to form a chain and fixing the stub shafts at the end of one link at right angles to the stub shafts on the adjacent end of the adjacent link, each said connecting means comprising means pivotally connected to the stub shafts on an end of one link and pivotally connected to the stub shafts on the adjacent end of the adjacent link and journalling the respective stub shafts for rotation about their longitudinal axes.

8. The chain of claim 7 wherein there are two stub shafts at each end of each link, said two stub shafts projecting from said link in opposite directions; and said connecting means comprises a member having first, second, third and fourth internal pivots, each fixed at right angles to the adjacent pivots; the two stub shafts on said one link being disposed respectively within said first and third pivots and the two stub shafts on said adjacent link being disposed within said second and fourth pivots.

References Cited

UNITED STATES PATENTS

| | | | |
|---|---|---|---|
| 1,790,297 | 1/1931 | Alger | 74—246 |
| 2,613,546 | 10/1952 | Jorgensen | 74—246 |

FOREIGN PATENTS

| | | |
|---|---|---|
| 60,081 | 3/1954 | France. |

FRED C. MATTERN, JR., *Primary Examiner.*

J. A. WONG, *Assistant Examiner.*